US007321940B1

(12) United States Patent
Smith et al.

(10) Patent No.: US 7,321,940 B1
(45) Date of Patent: Jan. 22, 2008

(54) ITERATIVE ARCHITECTURE FOR HIERARCHICAL SCHEDULING

(75) Inventors: Scott C. Smith, Mansfield, MA (US); Christopher J. Kappler, Waltham, MA (US); Andrew T. Hebb, Harvard, MA (US); Gregory S. Goss, Dunstable, MA (US); Robert T. Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

(21) Appl. No.: 10/610,181

(22) Filed: Jun. 30, 2003

(51) Int. Cl.
  *G06F 15/173* (2006.01)
  *G06F 15/16* (2006.01)
(52) U.S. Cl. .................. 709/240; 709/230; 709/232; 709/233; 709/234
(58) Field of Classification Search ........... 709/230, 709/232, 233, 234, 240; 370/395.4
See application file for complete search history.

(56) References Cited

U.S. PATENT DOCUMENTS

| 6,016,399 | A | 1/2000 | Chang ..................... 395/709 |
| 6,072,772 | A * | 6/2000 | Charny et al. ............. 370/229 |
| 6,236,413 | B1 | 5/2001 | Gossett et al. ............. 345/506 |
| 6,263,430 | B1 | 7/2001 | Trimberger et al. .......... 713/1 |
| 6,487,213 | B1 * | 11/2002 | Chao ..................... 370/418 |
| 6,519,595 | B1 * | 2/2003 | Rose ...................... 707/10 |
| 6,667,984 | B1 * | 12/2003 | Chao et al. ............... 370/414 |
| 6,714,553 | B1 * | 3/2004 | Poole et al. ............... 370/412 |
| 6,738,346 | B1 * | 5/2004 | Prieto et al. .............. 370/229 |
| 6,747,976 | B1 * | 6/2004 | Bensaou et al. ........... 370/395.4 |
| 6,865,154 | B1 * | 3/2005 | Charny et al. ............. 370/235 |
| 7,027,457 | B1 * | 4/2006 | Chiussi et al. ............. 370/414 |
| 2002/0073226 | A1 * | 6/2002 | Sridhar et al. ............. 709/235 |
| 2002/0101822 | A1 * | 8/2002 | Ayyagari et al. ............ 370/235 |
| 2002/0118683 | A1 * | 8/2002 | Narayana et al. ....... 370/395.42 |
| 2002/0122422 | A1 * | 9/2002 | Kenney et al. ............. 370/392 |
| 2002/0126690 | A1 * | 9/2002 | Narayana et al. ........... 370/444 |
| 2002/0176431 | A1 * | 11/2002 | Golla et al. ............... 370/412 |
| 2003/0021266 | A1 * | 1/2003 | Oki et al. ................. 370/388 |
| 2003/0033039 | A1 * | 2/2003 | Gutberlet et al. ............ 700/97 |

(Continued)

OTHER PUBLICATIONS

McKeown et al. The iSLIP Scheduling Algorithm for Input-Queued Switches, http://nms.csail.mit.edu/6829-papers/islip-ton.pdf, 1999.*

(Continued)

*Primary Examiner*—Bunjob Jaroenchonwanit
*Assistant Examiner*—Hieu Hoang
(74) *Attorney, Agent, or Firm*—BainwoodHuang (57) ABSTRACT

Conventional schedulers employ designs allocating specific processor and memory resources, such as memory for configuration data, state data, and scheduling engine processor resources for specific aspects of the scheduler, such as layers of the scheduling hierarchy, each of which consumes dedicated processor and memory resources. A generic, iterative scheduling engine, applicable to an arbitrary scheduling hierarchy structure having a variable number of hierarchy layers, receives a scheduling hierarchy structure having a predetermined number of layers, and allocates scheduling resources such as instructions and memory, according to scheduling logic, in response to design constraints and processing considerations. The resulting scheduling logic processes the scheduling hierarchy in iterative manner which allocates the available resources among the layers of the hierarchy, such that the scheduler achieves throughput requirements corresponding to enqueue and dequeue events with consideration to the number of layers in the scheduling hierarchy and the corresponding granularity of queuing.

28 Claims, 6 Drawing Sheets

U.S. PATENT DOCUMENTS

| | | | |
|---|---|---|---|
| 2004/0013089 A1* | 1/2004 | Taneja et al. | 370/235 |
| 2004/0064678 A1* | 4/2004 | Black et al. | 712/214 |
| 2004/0081167 A1* | 4/2004 | Hassan-Ali et al. | 370/395.42 |
| 2004/0264500 A1* | 12/2004 | Bansal et al. | 370/468 |
| 2005/0177644 A1* | 8/2005 | Basso et al. | 709/232 |

OTHER PUBLICATIONS

Kim et al. Hierarchical scheduling algorithm for QoS guarantee in MIQ switches. http://ieeexplore.ieee.org/iel5/2220/18791/00868134.pdf?arnumber=868134.*

Anderson et al. High speed switch scheduling for LANs. http://delivery.acm.org/10.1145/150000/143495/p98-anderson.pdf?key1=143495&key2=9272946711&coll=portal&dl=ACM&CFID=19890684&CFTOKEN=29677744.*

McKeown et al. The iSLIP Scheduling Algorithm for Input-Queued Switches, http://nms.csail.mit.edu/6829-papers/islip-ton.pdf, 1999.*

McKeown et al. The iSLIP Scheduling Algorithm for Input-Queued Switches, http://nms.csail.mit.edu/6829-papers/islip-ton.pdf, 1999.*

Kim et al. Hierarchical scheduling algorithm for QoS guarantee in MIQ switches. http://ieeexplore.ieee.org/iel5/2220/18791/00868134.pdf?arnumber=868134. Aug. 31, 2000.*

Anderson et al. High speed switch scheduling for LANs. http://delivery.acm.org/10.1145/150000/143495/p98-anderson.pdf?key1=143495&key2=9272946711&coll=portal&dl=ACM&CFID=19890684&CFTOKEN=29677744. 1992.*

* cited by examiner

ITERATIVE ARCHITECTURE FOR HIERARCHICAL SCHEDULING

BACKGROUND OF THE INVENTION

In a conventional network system, an interconnection of data communications devices transmits message traffic between users. Such conventional data communications devices perform switching of message traffic to transport the message traffic from a source node to a destination node. Conventional message traffic typically includes a series of packets, each containing a source and destination address, corresponding to the source and destination nodes, respectively. Switching engines in conventional data communications devices read the address information in the packets, and switch the packets to an outgoing line corresponding to the destination node.

In such a conventional network, a message packet is transported via multiple data communications devices between the source node and the destination node, in a series of "hops" along the interconnections. In such conventional data communications devices, the switching engines typically transport many packets corresponding to many different source and destination nodes. Accordingly, fast switching of the message packets is desirable to maintain message packet throughput, while minimizing the number of switching engines which the network employs for transporting the message traffic through the network.

Accordingly, conventional switching engines typically employ high-speed memory and processing control circuits between a plurality of ingress and egress ports. The physical network interconnections connect to the ingress and egress ports, each of which in turn, connect to other data communications devices having conventional switching engines, or to the end-user nodes themselves. Therefore, the high-speed memory and processing control circuits in conventional switching engines switch the packets in the ingress message traffic onto the egress ports at a rate such that the switching engines avoid a bottleneck of message traffic.

Accordingly, such conventional switching engines employ a scheduler to facilitate message throughput through the data communications device. Such a scheduler manipulates the high-speed memory and processing control circuits via a predetermined algorithm that quickly reads and interprets the address and other information in the packets. The scheduler then makes determinations, using the predetermined algorithm, concerning which message packets to transmit next on the egress ports. In this manner, a conventional scheduler prioritizes message traffic according to a variety of factors, such as packet address information, observable by such a conventional predetermined algorithm, in order to determine which packets to transmit and on which egress ports. Since the throughput through the data communications device depends largely on the conventional predetermined algorithm, the predetermined algorithm specifies a sequence of instructions operable to perform the switching operations such that many throughput events per second, corresponding to messages, are achievable.

However, such conventional high-speed memory and processing circuits in the scheduler are expensive, and increase the cost of the resulting data communications device. Therefore, excessive or unrestrained usage of such high-speed memory and processing circuits is undesirable in a conventional scheduler. Accordingly, a design process for a conventional data communications device includes selecting high-speed memory and processing circuits for the conventional scheduler therein, while achieving a balance between the cost of such high-speed memory and processing circuits and the throughput capacity of the resulting data communications device. Ideally, such a balance avoids bottlenecks in the network context into which the user employs the data communications device, while achieving an acceptable cost/performance factor for the user.

SUMMARY

Schedulers in conventional data communications devices follow a design specification that identifies the high-speed memory and processing circuits in the conventional data communications device. Due to consistently increasing user demands for higher and higher throughput rates and greater port density, and the accompanying increasing hardware speeds, schedulers need to aggressively address queuing and transmission prioritization of the message traffic through the data communications device. Further, scheduler design must remain cognizant of the overall cost of the data communications device. Accordingly, the selection and usage of the high-speed memory and processing circuits remains a major consideration in the design of schedulers in data communications devices.

Because of intensive cost competition in the data communications device industry, the resulting time-to-market pressures suggest expedited design schedules, while customer cost sensitivity requires narrow adherence to a cost-benefit heuristic between high-speed memory and processing circuits, and the resulting throughput performance. Accordingly, scheduler design encompasses optimal selection of the high-speed memory and processing circuits for a given throughput performance goal. Inclusion of excessive high-speed memory and processing circuits allows performance throughput goals to be met, however tends to drive cost to a point of infeasibility. Conversely, overly lean selection of high-speed memory and processing circuits tends to result in a data communications device which may fall short of throughput requirements for the target cost range.

Further, schedulers and the accompanying scheduling logic which implements the switching and prioritization algorithms, tends to employ multiple sets, or banks, of high-speed memory and processing circuits according to the scheduling logic. The scheduling logic compartmentalizes the message traffic, such that the scheduler dedicates memory and processing circuits to serve a particular aspect of the scheduling logic. Such aspects include, for example, layers in a scheduling hierarchy, or segments in a processing pipeline. However, since the high-speed memory and processing circuitry costs are significant in scheduler design, such designs employing specific high-speed memory portions for different aspects of the scheduling logic tends to result in sparse usage of the high-speed memory for any particular aspect. Accordingly, overall demand of the high-speed memory increases and processing circuitry.

Designers may attempt to increase the flexibility of the processing circuitry by performing scheduling operations in software rather than in ASICs or hardware. Software based operations, however, generally provide less throughput (speed) than dedicated hardware. Accordingly, the impact on throughput speed rapidly mitigates the benefit of software-based control when performance is desirable. In such high-speed schedulers, throughput requirements generally allow for few, if any, software based operations because of the impact on throughput speed.

The schedulers in conventional data switching devices, therefore, suffer from a variety of deficiencies. Such conventional schedulers employ designs which allocate specific processor and memory resources, such as memory for configuration data, state data, and scheduling engine processor resources for specific aspects of the scheduler, such as layers of the scheduling hierarchy, each of which therefore employs dedicated processor and memory resources. Accordingly, scheduler design constraints include the specification of the hierarchy and related high-speed memory and processor resources. The scheduler has dedicated the high-speed memory and processor resources specific to layers or other aspects of the hierarchy. Therefore, alternative scheduling logic, which alters the layers or structure of the scheduling hierarchy, mandates scheduler redesign to accommodate scheduling resources for each layer of the design hierarchy.

It would be beneficial therefore, to share scheduling resources, such as scheduling logic and high-speed scheduler memory, applicable to each layer in a scheduling hierarchy. Such an architecture provides scheduling resources such as processor instructions, scheduler memory, and the hierarchy structure which correspond generically to a scheduling engine. Such a generic scheduling engine is responsive to an arbitrary hierarchical structure having a variable number of hierarchy layers, which is therefore applicable to multiple scheduler designs based on various performance and cost variations and trade-off options.

The present invention substantially overcomes the problems discussed above with respect to scheduler design constraints by a defining an iterative, generic scheduling engine applicable to an arbitrary scheduling hierarchy structure having a variable number of hierarchy layers. The iterative, generic scheduling engine, as defined by the present claims, is operable to receive a scheduling tree configuration, define a scheduling hierarchy structure having a predetermined number of scheduling hierarchies, each having a number of layers according to the configuration, and allocate scheduling resources, such as a number of instructions per second and areas of high-speed scheduler memory, according to predetermined scheduling logic, as a result of the design constraints and processing considerations. The resulting scheduling logic is operable to process the scheduling hierarchy in iterative manner which allocates the available resources, such as instructions per second, among the layers of the hierarchy, such that throughput requirements corresponding to enqueues and dequeues per second is achievable with consideration to the number of layers in the scheduling hierarchy and the corresponding granularity of queuing control.

The scheduling tree configuration containing the scheduling hierarchy structure is defined by an user, such as an engineer or designer, and stored in a configuration object such as a configuration file. The scheduler reads the scheduling tree configuration at startup, and on subsequent events such as a revision or addition to the scheduling tree configuration. The scheduling tree configuration specifies the number of hierarchies, the structure of the hierarchies, and the apportionment of the scheduling resources such that the scheduler executes the iterations through the hierarchy according to the predefined scheduling tree configuration.

Therefore, the generic scheduling engine architecture allows design trade-offs concerning scheduling resources applicable to a scheduling hierarchy such that multiple scheduler designs encompassing trade-offs between a number of queuing events per second and layers of the hierarchy are applicable to multiple implementations, or instantiations employing the same scheduling engine. Such a generic scheduling engine need not undergo redesign and corresponding reallocation of scheduler resources to implement alternative hierarchical scheduling structures. The iterative scheduling engine, therefore, expects configuration data from available designs sources such as the configuration file, and applies the configuration data to available high-speed memory and processing instruction resources. Since the number of layers in such a scheduling hierarchy tends to be inversely proportional to the number of throughput messages per second (assuming constant instruction per second rates for the particular scheduling algorithm), a scheduling hierarchy having a greater number of layers is achievable with lower overall message per second throughput, since each layer in the hierarchy consumes instruction resources for each enqueue or dequeue event. Alternatively, an architecture specifying higher throughput (messages per second) is achievable with a hierarchy having fewer layers, since less scheduling iterations are necessary.

In further detail, in a particular arrangement, the architecture method for allocating throughput via a scheduler in a data communications device includes identifying, based on a throughput requirement, a quantity of instructions per second corresponding to the throughput requirement, and defining, consistent withthe throughput requirement, a scheduling hierarchy having a number of layers, each of the layers having at least one schedule operable to store schedulable entities representing messages. The scheduling hierarchy is responsive to scheduling logic for prioritizing message traffic according to the throughput requirement. A configuration mechanism configures the scheduling logic operable to provide the throughput requirement onto a scheduling core in communication with the scheduling hierarchy, in which the scheduling hierarchy is responsive to the scheduling logic for manipulating the schedulable entities among the schedules in the scheduling hierarchy, the scheduling core independent of the layers and schedules in the scheduling hierarchy.

The throughput requirement further comprises a number of enqueue events per second and a number of dequeue events per second, corresponding to a number of messages which the scheduler is operable to receive and transmit, respectively. The scheduling logic is operable to iterate through the hierarchy, in which each iteration corresponds to one of the layers in the scheduling hierarchy. An iteration through each layer of the hierarchy results in a message event of enqueue or dequeue. Accordingly, the number of instructions allocated among the layers of the hierarchy provides the events per second.

The schedules in the hierarchy further comprise a parent-child arrangement, each of the schedules having at least one parent-child association with another schedule in the hierarchy. This hierarchical arrangement, therefore, forms a fan-in/fan out structure which facilitates traversal by the scheduling core because highest priority messages occupy the schedule at the layers having greater fan-in (i.e. least numbers of schedules). Typically, the root level of the hierarchy has a single schedule from which the scheduling core dequeues entries.

The scheduler iterates through the scheduling hierarchy by traversing the schedules in the scheduling hierarchy according to the parent-child associations and examining, according to the scheduling logic, schedulable entities in the traversed schedules. The scheduling core then propagates schedulable entities from one schedule to another schedule via the parent child associations according to the scheduling logic. The schedulable entities representing messages, therefore, travel along the hierarchy toward the root until a dequeue event dequeues and forwards the message.

Another arrangement defines multiple scheduling mechanisms, each of the scheduling mechanisms corresponding to at least one of the hierarchies, and operable to accommodate the throughput requirement. The scheduling mechanisms correspond to a set of steps, such as a scheduling algorithm, based on the throughput requirement, the scheduling mechanism including identifying a scheduling criteria corresponding to scheduling parameters and identifying a number of instructions per second executable by the scheduling core. Such scheduling parameters include time based, size based, priority based, and quality based criteria, or variables, associated with the schedulable entities, and may also include which of logical queues, physical queues, multilink bundle queues, and ports to which the entity corresponds. Employing these criteria allows a design process to select, based on the scheduling criteria and the instructions per second, a number of layers for the scheduling hierarchy. Each of the layers in the scheduling hierarchy corresponds to at least one of the scheduling parameters, the scheduling core associating each of the layers with at least one of the scheduling parameters. For example, the scheduling core may associate one layer of the hierarchy with logical queues and another with outgoing physical ports.

In alternate arrangements, a plurality of scheduling cores cooperatively operate on a plurality of scheduler layers for a particular scheduling hierarchy by associating each of the scheduling cores with at least one of the selected layers, and coupling the plurality of scheduling cores for iterating through each of the layers corresponding to the scheduling core, the coupling providing communication from one layer to an adjacent layer in the scheduling hierarchy to define a pipelined arrangement of the layers.

The scheduling hierarchy may, in further configurations, define scheduling resources including configuration data resources operable to store configuration data defining each of the schedulable entities in the scheduling hierarchy and state data resources operable to store a status of each of the schedulable entities in the scheduling hierarchy.

The scheduling core may couple to a feature core, in which the scheduling hierarchy is responsive to the feature core for manipulating the schedulable entities for providing configurable scheduling extensions, the configurable scheduling extensions further comprising multilink capability and flow control status.

Deployment of the architecture, in particular arrangements, produces output in the form of a configuration object, such as a configuration file, for example, for encoding the identified throughput requirements and the defined scheduling hierarchy into the scheduling core, in which encoding the scheduling logic further comprising processing the configuration object.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The present invention substantially overcomes the problems discussed above with respect to scheduler design constraints by a defining an iterative, generic scheduling engine applicable to an arbitrary scheduling hierarchy structure having a variable number of hierarchy layers. The generic scheduling engine, as defined by the present claims, is operable to receive a scheduling tree configuration, define a scheduling hierarchy structure having a predetermined number of layers, and which has allocated to it, in response to design constraints and processing considerations, scheduling resources such as a number of instructions per second, and a predetermined area of high-speed scheduler memory, according to predetermined scheduling logic, as a result of the design constraints. The resulting scheduling logic is operable to process the scheduling hierarchy in an iterative manner according to the allocated available resources, such as instructions per second, among the layers of the hierarchy, such that throughput requirements corresponding to a rate of enqueues and dequeues is achievable with consideration to the number of layers in the scheduling hierarchy and a corresponding granularity of queuing control.

Therefore, the iterative, generic scheduling engine architecture allows design trade-offs concerning scheduling resources applicable to a scheduling hierarchy, such that multiple scheduler designs encompassing considerations between a number of queuing events per second, and layers of the hierarchy, are applicable to the same scheduling engine. Such a generic scheduling engine need not undergo redesign and corresponding reallocation of scheduler resources to implement refinements to hierarchical scheduling structures. The generic scheduling engine, therefore, reads configuration data from a data object such as a configuration file, and applies the configuration to available memory and queuing resources. Due to channelization, the number of layers in such a scheduling hierarchy tends to be inversely proportional to the number of throughput messages per second (assuming a constant instruction per second rate). Therefore, a scheduling hierarchy having a greater number of layers is achievable with lower overall message per second throughput, or higher throughput is achievable employing a hierarchy having fewer layers. Accordingly, more enqueue and dequeue events may occur, since less scheduling iterations are needed.

Figure 1:
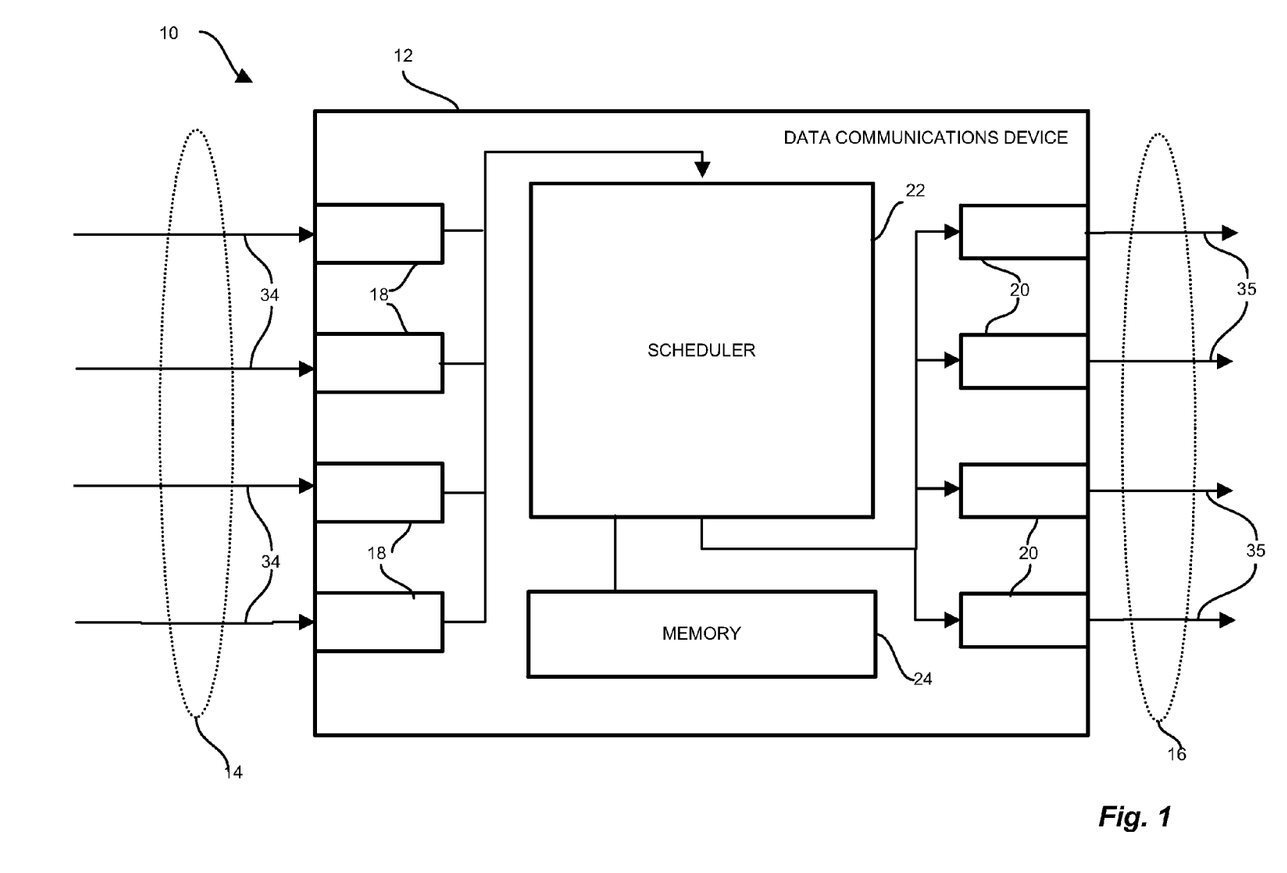
FIG. 1 is a data communications device in a communications network suitable for use in conjunction with the present invention.

FIG. 1 is a data communications device in a communications network 10 suitable for use in conjunction with the present invention. Referring to FIG. 1, the network includes the data communications device 12, a plurality of ingress lines 14 and a plurality of egress lines 16. The data communications device 12 further includes a scheduler 22 and memory 24. Also, the data communications device 12 includes a plurality of ingress ports 18 and a plurality of egress ports 20.

The ingress lines 14 and the egress lines 16 connect to the data communications device 12 for data traffic incoming to and emanating from, respectively, the data communications device 12. The ingress lines 14 and egress lines 16 are capable of interconnecting to other nodes in the network (not shown) for transmitting network 10 traffic. The ingress lines 14 and egress lines 16 connect to ingress ports 18 and egress ports 20, respectively, on the data communications device 12. The scheduler 22 in the data communications device 12 also connects to the ingress ports 18 and to the egress ports 20 for transporting message throughput through the data communications device 12, and connects to memory 24 for queuing and buffering the individual message payload and other message specific information.

In operation, incoming message traffic, shown by arrows 34, arrives on the ingress lines 14, at the ingress ports 18. The scheduler 22 receives the message traffic 34 from the ingress ports 18, and queues and schedules the messages (e.g. message packets, in a typical IP-based network) in the message traffic 34 for subsequent transmission. The scheduler 22 stores the messages in the memory 24 until a transmission time, or dequeue event, resulting from scheduling by the scheduler 22, elapses. The scheduler 22 then transmits the outgoing message traffic 35 by sending the messages to particular egress ports 20, for transmission on a particular egress line 16, in response to the scheduling by the scheduler 22. The scheduler 22 therefore organizes and controls messages for outgoing transmission according to scheduling logic, described further below, to determine message traffic 35 is transmission order and outgoing port 20 selection. The outgoing message traffic 35, therefore, emanates from the particular egress line 16 corresponding to the egress ports 20 in response to the scheduling.

Figure 2:
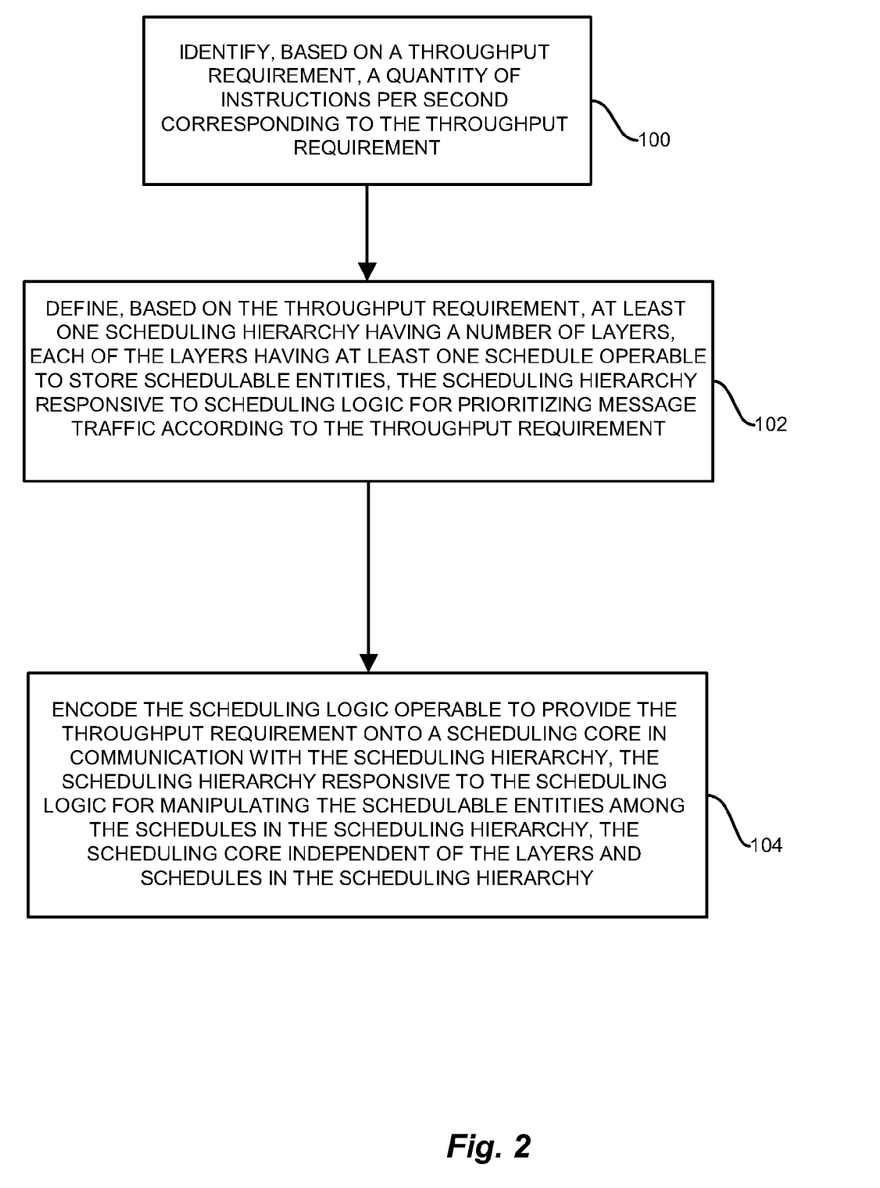
FIG. 2 is a flowchart showing allocation of scheduling resources in the data communications device of FIG. 1.

FIG. 2 is a flowchart of allocating scheduling resources in the data communications device 12 of FIG. 1. Referring to FIG. 2, an architecture method for allocating throughput in a data communications device is shown. At step 100, a design criteria identifies, based on a throughput requirement, a quantity of instructions per second corresponding to the throughput requirement. The design criteria, in a typical configuration, involves engineering criteria according to a design heuristic.

At step 102, a configuration file or other electronic storage media defines, based on the throughput requirement, at least one scheduling hierarchy having a number of layers, each of the layers having at least one schedule operable to store schedulable entities, the scheduling hierarchy responsive to scheduling logic for prioritizing message traffic according to the throughput requirement. A particular arrangement involves an operator such as an engineer or technician receiving a physical layout resulting from the design heuristic, and transforming the layout into an electronic form, or configuration, for definition in the scheduler 22. The encoding results in a configuration file (49, FIG. 3 below) or other electronic storage medium which the scheduler receives.

The configuration file defines at least one scheduling hierarchy, corresponding to the scheduling core for a particular design. The number of scheduling hierarchies, as well as the number and structure of the levels of the hierarchies, are selectable in the configuration file (object). Further, each scheduling hierarchy is associated with a particular scheduling mechanism in the scheduling logic, therefore, not all hierarchies need conform to a particular common set of scheduling steps. Each of the selectable scheduling mechanisms (also referred to as scheduling algorithms, below) examines particular scheduling parameters to determine which schedulable entity to advance.

At step 104, a scheduling core in communication with the scheduling hierarchy encodes the scheduling logic operable to provide the throughput requirement, the scheduling hierarchy responsive to the scheduling logic for manipulating the schedulable entities among the schedules in the scheduling hierarchy, the scheduling core independent of the layers and schedules in the scheduling hierarchy. The scheduling logic stores the methodology, or sequence of steps, which determines, for each of the hierarchies within the scheduling core, the schedulable entities to advance toward the root. Advancement occurs by analyzing scheduling parameters to determine the best entity to advance. Such scheduling parameters include, by way of example only, time based, size based, priority based, and quality based criteria, or variables, associated with the schedulable entities, and may also include which of logical queues, physical queues, multilink bundle queues, and ports to which the entity corresponds. Other scheduling parameters may be employed in alternate arrangements. Therefore, the scheduling core is not bound to a physical structure, or layers and schedules, in the scheduling hierarchy. Accordingly, the scheduling core 38 (FIG. 3, below) may receive an alternate encoding representing a different scheduling hierarchy without redesigning or reallocating the high-speed memory or associating it with particular aspects or layers in the scheduling core.

Figure 3:
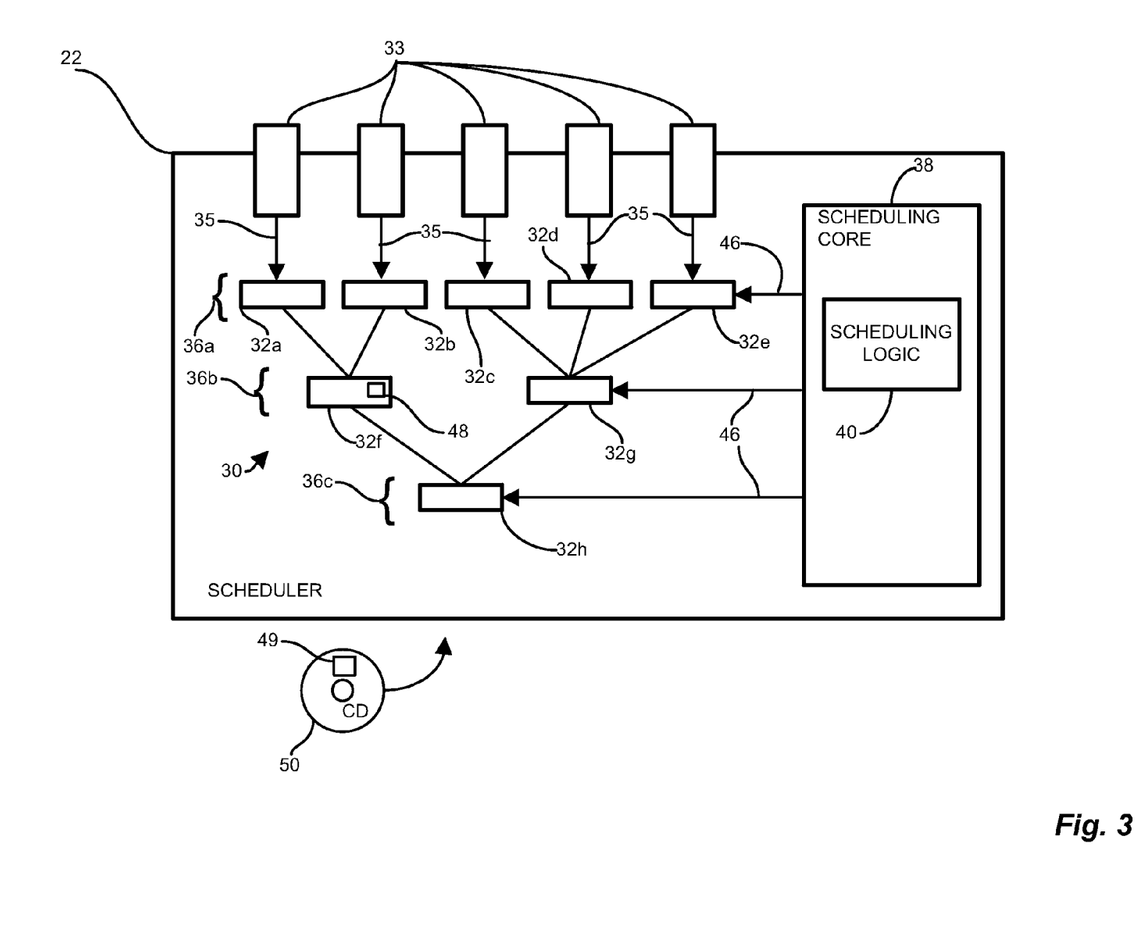
FIG. 3 shows a scheduler in the data communications device of FIG. 1 in greater detail.

FIG. 3 shows a scheduler 22 in the data communications device of FIG. 1 in greater detail. Referring to FIGS. 3 and 1, the scheduler 22 in the data communications device 12 includes a scheduling core 38 having scheduling logic 40. The data communications device 12 also includes plurality of logical queues 33, and a scheduling hierarchy 30 having a plurality of schedules 32a-32h, arranged in layers 36a-36c.

The scheduling core 38 resides in the scheduler 22, and is in communication with each of the layers 36a-36c of the scheduling hierarchy 30, as shown by arrows 46. The scheduling core 38 also includes the scheduling logic 40, which contains the predetermined rules and mechanism for priority and selection of a transmission order for the egress message traffic 35. The scheduling hierarchy 30 in the scheduler 22 manipulates the plurality of schedules 32a-32h, (32n generally), arranged in the scheduling hierarchy 30 and responsive to the scheduling core 38. Each of the schedules 32n includes one or more schedulable entities 48, described further below. The arrangement of the schedules further defines layers 36a-36c (36n generally) in the scheduling hierarchy. The scheduling hierarchy 30 is responsive to the scheduling core 38, for manipulating schedulable entities 48 between the schedules 32n, as shown by arrows 46. The layers 36n in the scheduling hierarchy 30 correspond to particular entities, for example logical or physical, responsive to the scheduling logic 40. The logical queues 33 couple to the ingress ports 18 for receiving the incoming message traffic 34 into the scheduler 22. As discussed further below, each of logical queues 33 corresponds to a particular leaf layer 36a schedule 32a-32e in the scheduling hierarchy 30, as shown by arrows 35.

In operation, incoming message traffic 34 arrives at the logical queues 33 for scheduling according to the scheduling logic 40. The scheduling logic 40 specifies the traversal order in which the scheduling core 38 traverses the schedules 32n in the scheduling hierarchy 30. Messages 34 from the ingress ports 18 arrive in logical queues 33n, and the scheduling core 38 receives the messages 34 into one of the leaf layer schedules 32a-32e on layer 36a, according to the scheduling logic 40. The scheduling logic 40 traverses the scheduling hierarchy 30 or hierarchies in iterative manner, discussed further below, to determine the next schedulable entity 48 to dequeue from the root layer 36c. The stream of message traffic 34 from the ingress ports 18, therefore, migrates through the schedules 32n in each of the hierarchy 30 from the leaf layer 36a to the root layer 36c by the scheduling core 38 for transmission as outgoing message traffic 35.

The scheduling logic 40 directs the scheduling core 38 to manipulate schedulable entities 48 among the schedules 32, by traversing the scheduling hierarchy 30 in an iterative manner. The scheduling logic 40 visits the schedules 32n and propagates schedulable entries 48 in the schedules 32n (described below) from the leaf layer 36a to the root layer 36c. In this manner, the scheduling logic 40 selects entries 48 for the scheduling core 38 to dequeue and subsequent transmit on the egress lines 16 by propagating the entries along the scheduling hierarchy 30 from the leaf layer 36a to the root layer 36c.

The scheduler shown in FIG. 3 is exemplary, and includes three layers. Alternate configurations contain other numbers of layers 36n, typically 2 to 6, however, the scheduling core 38 is operable to address an arbitrary number of layers 36n, according to the scheduling logic 40. Therefore, the scheduling logic 40 traverses the scheduling hierarchy 30 from leaf layer 36a to root layer 36c, examining and propagating schedulable entities 48 towards the root 32h, for transmission on the egress lines 16. A variety of rules concerning scheduling logic 40 populate the scheduling logic 40 prior to deployment to in the scheduling core 38. Such rules determine variables such as the number of layers, the scheduling hierarchy 30 and structure of schedules 32n therein, the number of schedulable entities 48 per schedule 32n, the prior categorization of messages 35, based on such factors as size and time in queue for example, and logical queues corresponding to the egress ports 20, resulting from channelization of the physical lines 16 supporting the ports 20.

Figure 4:
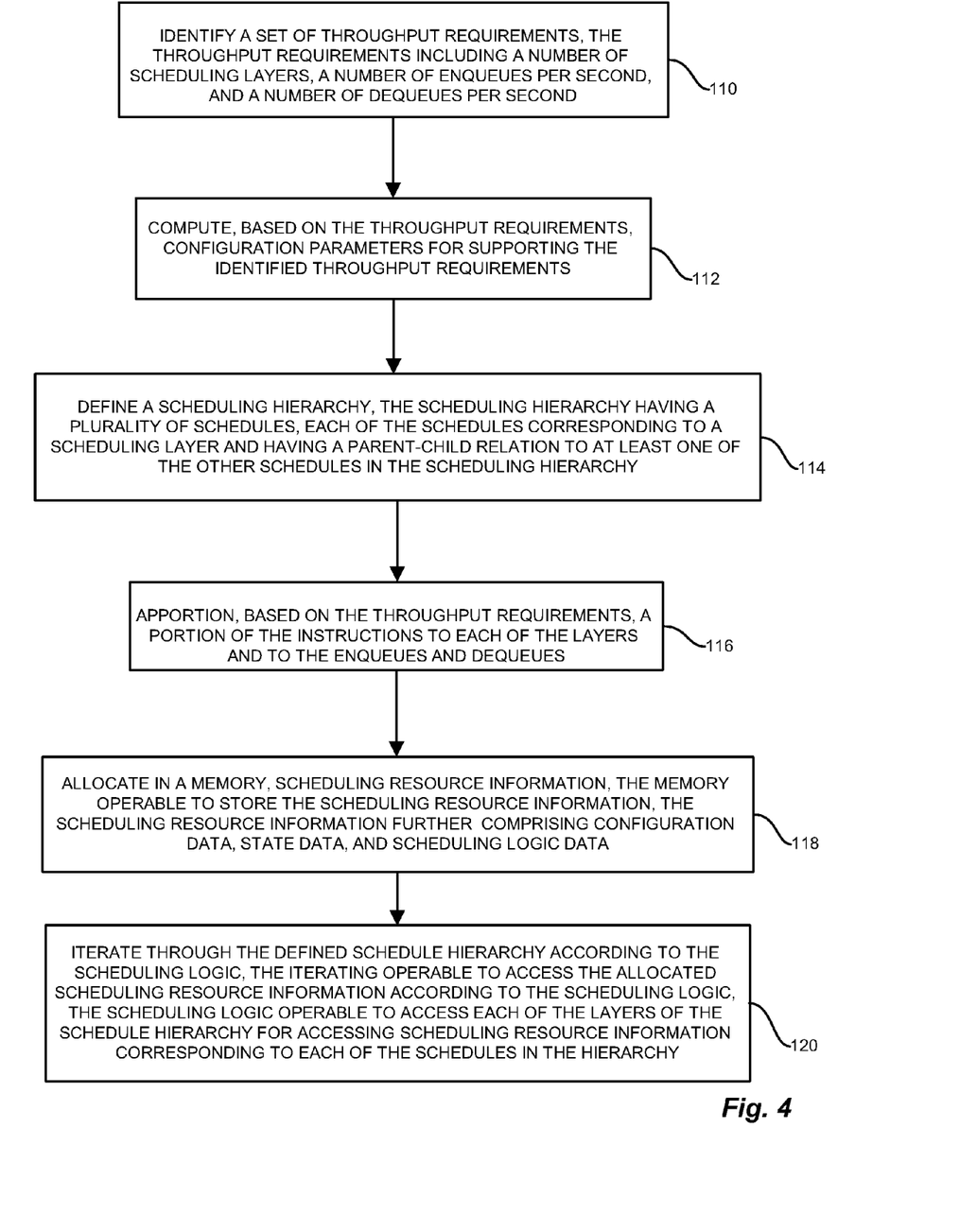
FIG. 4 shows a flowchart of allocating scheduling resources in the scheduler of FIG. 3 in greater detail.

FIG. 4 shows a flowchart of allocating scheduling resources in the scheduler 22 of FIG. 3 in greater detail. Referring to FIGS. 4 and 3, at step 110, a designer or design heuristic identifies a set of throughput requirements, the throughput requirements including a number of scheduling layers 36n, a number of enqueues per second, and a number of dequeues per second. At step 112, the scheduler designercomputes, based on the throughput requirements and/or a design heuristic, a number of instructions per second for supporting the identified throughput requirements. At step 114, the configuration object (49, described further below) is read, based on which the scheduling core 38 manipulates a scheduling hierarchy 30 resulting from the design heuristic, in which the scheduling hierarchy 30 has a plurality of schedules 32n, each of the schedules corresponding to a scheduling layer 36n and having a parent-child relation to at least one of the other schedules 32n in the scheduling hierarchy 30. At step 116, responsive to the configuration object (49, described further below), the scheduling core 38 apportions, based on the throughput requirements, a portion of the instructions to each of the layers 36n and to the enqueues and dequeues. At step 118, the configuration object allocates, in the memory 24, scheduling resource information, in which the memory 24 is operable to store the scheduling resource information. In a particular configuration, the scheduling resource information further includes configuration data, state data, payload storage, and scheduling logic. At step 120, the scheduling core 38 employs the scheduling logic 40 to iterate through the defined scheduling hierarchy 30, in which the iterating is operable to access the allocated scheduling resource information according to the scheduling logic 40, the scheduling logic 40 operable to access each of the layers 36n of the scheduling hierarchy 30 for accessing scheduling resource information, described further below, corresponding to each of the schedules 32n in the hierarchy 30.

Figure 5:
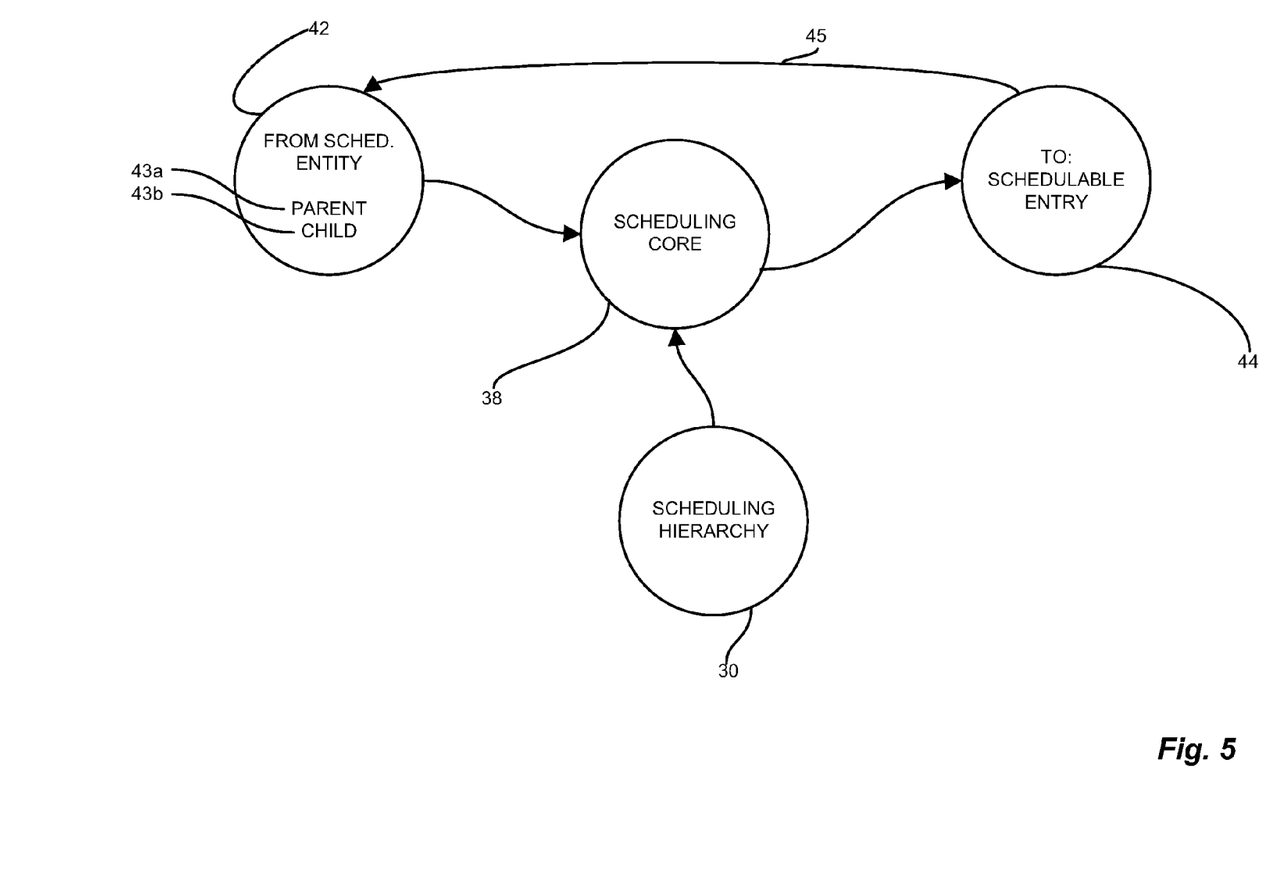
FIG. 5 shows a dataflow of scheduling resources in the scheduler of FIG. 4.

FIG. 5 shows a dataflow of scheduling resources in the scheduler of FIG. 4. Referring to FIGS. 5 and 3, a dataflow diagram of the scheduling hierarchy 30 traversal by the scheduling core 38 is shown. The scheduling core 38 traverses the scheduling hierarchy 30 by selecting schedules 32n, each of which has a parent-child association with other schedules, as indicated above. The scheduling core 38 accesses a schedule 42 from which to select an entry for advancement. The schedule 42 schedule has status fields 43a-43b which store status values indicative of the scheduling resource information. Note that each schedule 32n is operable to be either a parent schedule or a child schedule with respect other schedules depending on the traversal schedule.

Each schedule 42 includes schedulable entities 48, each having a parent 43a field and a child 43b field indicative of the respective parent and child schedules. Typically these fields represent pointers to the parent 43a and child 43b schedules, respectively, although alternate data structures which indicate the hierarchical structure may also be employed. The scheduling core 38 examines the schedulable entities 48 in the schedule 42 and applies the scheduling logic 40 to determine which schedulable entity 48 to advance to the next (parent 42a) TO: schedule 44 in the scheduling hierarchy 30. Each iteration includes a consideration and advancement of a schedulable entity 48 to a particular schedule 32n. The next iteration includes consideration of another FROM: schedule 42 at the next successive level, as shown by arrow 45

The scheduling core 38 therefore, receives a determination by the scheduling logic 40 indicating which schedulable entity 48 is to advance in the scheduling hierarchy 30. A TO: schedule entity 44 indicates which schedule 32 and the selected schedule entity 44 to advance to. The scheduling core 38 updates the scheduling hierarchy 30 with the updates from the data items 43a and 43b. The advancement of schedulable entities 48 in the scheduling hierarchy 30 by the scheduling core 38 is now discussed with respect to FIG. 6.

Figure 6:
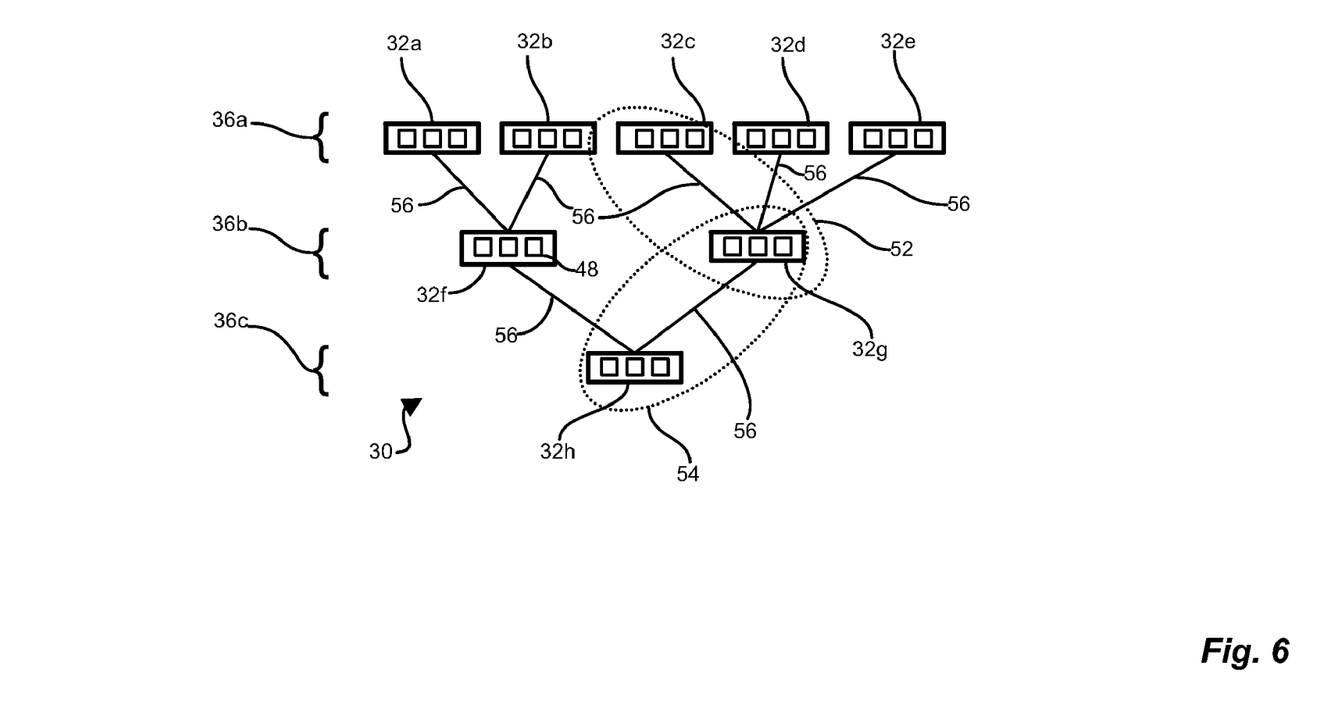
FIG. 6 shows an example of scheduling of transmission resources in the scheduler of FIG. 4.

FIG. 6 shows an example of scheduling of transmission resources in the scheduler 22 of FIG. 3. Referring to FIGS. 6 and 3, the scheduling hierarchy 30 is shown in greater detail. As discussed above, the scheduling hierarchy 30 includes a plurality of layers 36a-36c, however, alternate configurations include an arbitrary number of layers 36n. Each layer 36n in the scheduling hierarchy 30 includes a number of schedules 32a-32h, in the example shown, however as with the number of layers 36n, alternate configurations employ varying numbers of schedules 32n and hierarchy layers 36n. As described above, each of the schedules 32n is operable to store at least one schedulable entity 48. The schedulable entities 48 represent message packets (corresponding to messages 34 of FIG. 1) which propagate along the scheduling hierarchy 30 via traversal by the scheduling core 38, according to the scheduling logic 40, which determines prioritization of the schedulable entities 48 and therefore the next schedulable entity 48 in each schedule 32n for consideration for transmission. The scheduling core 38 traverses the scheduling hierarchy 30 by visiting schedule pairs, shown by dotted lines 52 and 54.

As indicated above, the scheduling hierarchy denotes associations 56 between parent-child pairs of schedules 32n. During the traversal, the scheduling core visits schedules 32n at adjacent layers 36n according to the associations 56. A variety of traversal patterns will be apparent to those skilled in the art, particularly with regard to binary and N-ary trees. Accordingly, traversals discussed herein according to the scheduling logic 40 are exemplary. Alternative configurations are applicable to the scheduling logic 40, which may encode such alternate traversal methods without deviating from the spirit and scope of the claimed invention.

In operation, the scheduling core 38 traverses the scheduling hierarchy 30 from leaf layer 36a to the root layer 36c in the example shown, that is, from layer 36a having the greatest fan out, or most schedules 32n and, to the layer 36a having the least number of schedules 32n i.e. one. Each iteration transfers a schedulable entity 48 from one schedule at a particular level to the next successive level. A traversal from the leaf to the root includes an iteration at each level through the scheduling hierarchy 30, as illustrated by the aggregation of associations 52 and 54. Accordingly, each iteration through the scheduling hierarchy 30 addresses a schedule 38n on a particular layer 36n of the scheduling hierarchy 30. Therefore, the scheduling core 38 is operable to address an arbitrary number of layers 36n in a given hierarchy 30. As illustrated in FIG. 5, above, the scheduling core 38 need only receive the inputs parent 43a and child 43b schedules 32n defined by the parent-child association 56 of the scheduling hierarchy 30. An arbitrary hierarchical structure 30 therefore is serviceable by the scheduling core 38.

During scheduling hierarchy 30 traversal, as illustrated above, the scheduling core 38 traverses associations 56 spanning each pair of layers 36n in the scheduling hierarchy 30. Accordingly, increasing the number of layers 36n in the scheduling hierarchy 30 increases the number of iterations that the scheduling core 38 undertakes during each traversal through the scheduling hierarchy 30. Each interlayer comparison, as shown by dotted lines 52 and 54, requires a processing instruction. Accordingly, the number of iterations required to traverse the scheduling hierarchy 30 from leaf layer 36a to root layer 36c is equal to the number of layers minus one. However, each dequeue event resulting in a packet for transmission requires a traversal from the leaf layer 36a to the root layer 36c to propagate and dequeue (free) an additional schedulable entity 48.

As discussed above, scheduler 22 design involves selection of resources including memory 24 and processing (scheduling core 40) resources. Such resources are expressed in terms of a number of instructions per second achievable based on the speed of the processor coupled with the speed of the memory for executing operations associated with each traversal of the scheduling hierarchy 30. Therefore, processor and memory are selectable based on the structure of the scheduling hierarchy 30 resulting from a particular design (i.e. the number of layers 36n and fan outs of the hierarchy has denoted by the hierarchy structure 30). The number of layers 36n, in the scheduling hierarchy 30 and the aggregate quantity of events, both enqueue and dequeue, denotes the number of instructions per second that the scheduling resources 40 need to achieve.

In this manner, scheduler design specifies a scheduling hierarchy 30, coupled with requirements for throughput, and results in a scheduling configuration 49 including the tree structure of the scheduling hierarchy 30, a number of enqueue event per second, and a number of dequeue events per second, applicable to the design. A requirement set of the user provides quantifiable input to such a scheduler design, which results in a cost-benefit analysis towards modifications to the user requirements. A user may therefore elect to increase cost for providing the necessary number of instructions per second to support the design specified for the scheduling hierarchy 30, or may elect to opt for simpler scheduling logic 40 having fewer layers 36n in the scheduling hierarchy 30 and accordingly, less granularity in the queueing and scheduling logic 40, to achieve acceptable throughput at an acceptable cost.

Referring again to FIG. 3, such a scheduling configuration is deliverable to the scheduling core 38 in the form of a configuration objected, such as a datafile 49, which specifies the scheduling hierarchy 30 and structure, and therefore the number of layers 36n, number of schedules 32n and, and the scheduling logic 40 for traversing the scheduling hierarchy 30. The scheduling configuration is deliverable by any suitable means to a data communications device 12 having a scheduler 22. Such configuration objects may be delivered on CD ROM 50, floppy disk, downloaded from web site via the Internet, or other suitable means for transporting deliverable code.

Those skilled in the art should readily appreciate that the programs and methods encoded on transport media for defining hierarchical schedulers as defined herein are deliverable to a data communications device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While the system and method for defining hierarchical schedulers has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. An architecture method for allocating throughput in a data communications device comprising:

identifying, based on a throughput requirement, scheduling parameters corresponding to the throughput requirement;

defining, based on the throughput requirement, a scheduling hierarchy having a number of layers, each of the layers having at least one schedule operable to store schedulable entities, the scheduling hierarchy responsive to scheduling logic for prioritizing message traffic according to the throughput requirement; and encoding the scheduling logic, the scheduling logic operable to provide the throughput requirement, onto a scheduling core in communication with the scheduling hierarchy, the scheduling hierarchy responsive to the scheduling logic for manipulating the schedulable entities among the schedules in the scheduling hierarchy, the scheduling core independent of the layers and schedules in the scheduling hierarchy;

wherein the schedules in the scheduling hierarchy further comprise a parent-child arrangement, each of the schedules having at least one parent-child association with another schedule in the scheduling hierarchy;

wherein iterating through the scheduling hierarchy comprises:

traversing the schedules in the scheduling hierarchy according to the parent-child associations;

examining, by the scheduling logic, schedulable entities in the traversed schedules; and propagating the schedulable entities from one schedule to another schedule via the parent child associations according to the scheduling logic.

2. The method of claim 1 wherein the throughput requirement further comprises a number of enqueue events per second and a number of dequeue events per second, each of the enqueue events and the dequeue events having a corresponding number of instructions per second.

3. The method of claim 1 wherein encoding the scheduling logic further comprises encoding scheduling logic operable to iterate through the hierarchy, each iteration corresponding to one of the layers in the scheduling hierarchy.

4. The method of claim 1 further including defining a scheduling heuristic based on the throughput requirement, the scheduling heuristic comprising:

identifying, a scheduling criteria corresponding to the scheduling parameters;

identifying a number of instructions per second of the scheduling core;

selecting, based on the scheduling criteria and the instructions per second, a number of layers for the scheduling hierarchy, each of the layers corresponding to at least one of the scheduling parameters; and associating each of the layers with at least one of the scheduling parameters.

5. The method of claim 1 further comprising a plurality of scheduling cores and:

associating each of the scheduling cores with at least one of the layers;

coupling the plurality of scheduling cores for iterating through each of the layers corresponding to the scheduling core, the coupling providing communication from one layer to an adjacent layer in the scheduling hierarchy to define a pipelined arrangement of the layers.

6. The method of claim 1 wherein defining the scheduling hierarchy further comprises defining scheduling resources, the scheduling resources including configuration data resources operable to store configuration data defining each of the schedulable entities in the scheduling hierarchy and state data resources operable to store a status of each of the schedulable entities in the scheduling hierarchy.

7. The method of claim 1 further comprising a feature core coupled to the scheduling core, the scheduling hierarchy responsive to the feature core for manipulating the schedulable entities for providing configurable scheduling extensions, the configurable scheduling extensions further comprising multilink capability and flow control status.

8. The method of claim 1 further comprising defining a configuration object wherein the configuration object is indicative of the identified throughput requirements and the defined scheduling hierarchy, and encoding the scheduling logic further comprising processing the configuration object.

9. The method of claim 8 wherein defining the configuration object further comprises revising the configuration object, reprocessing and applying the revised configuration object in a nonintrusive manner, the nonintrusive manner operable to allow schedulable entities to remain enqueued in the scheduling hierarchy.

10. The method of claim 1 wherein defining includes defining a plurality of scheduling hierarchies, each of the scheduling hierarchies corresponding to the scheduling core and responsive to the scheduling logic.

11. The method of claim 1 wherein the scheduling parameters comprise time based criteria, priority based criteria, quality based criteria, size based criteria, logical channels, logical queues, multilink bundle queues and physical ports.

12. A generic scheduling engine comprising:

a hierarchical scheduling structure, the hierarchical scheduling structure having a set of schedules arranged in a hierarchy, each of the schedules operable to store schedulable entities and having a parent-child relation to at least one other schedule in the hierarchy;

a scheduling core in communication with the hierarchical scheduling structure, the scheduling core having scheduling logic operable to manipulate the schedulable entities within the hierarchical scheduling structure, the scheduling logic further operable to prioritize, according to predetermined rules, allocation of transmission resources to each of the schedulable entities;

a memory responsive to the scheduling logic for storing scheduling resource information corresponding to each of the schedulable entities; and configuration data indicative of a number of layers in the hierarchical scheduling structure, each of the schedules corresponding to a layer, the number of layers, the hierarchy, and the predetermined rules independent of the hierarchical scheduling structure, the scheduling core, and the memory;

wherein the scheduling core is further operable to iterate through the scheduling hierarchy; and traverse the schedules in the scheduling hierarchy according to the parent-child associations;

examine, by the scheduling logic, schedulable entities in the traversed schedules; and propagate the schedulable entities from one schedule to another schedule via the parent child associations according to the scheduling logic.

13. The scheduling engine of claim 12 wherein the scheduling logic is defined by a throughput requirement, the throughput requirement further comprising a number of enqueue events per second and a number of dequeue events per second, each of the enqueue events and the dequeue events having a corresponding number of instructions per second.

14. The scheduling engine of claim 12 wherein the scheduling core is further operable to iterate, according to the scheduling logic, through the hierarchy, each iteration corresponding to one of the layers in the scheduling hierarchy.

15. The scheduling engine of claim 12 wherein the configuration data is further indicative of a parent child association between the schedules in the scheduling hierarchy, each of the schedules having at least one parent-child association with another schedule in the scheduling hierarchy.

16. The scheduling engine of claim 13 further comprising a scheduling heuristic based on the throughput requirement encoded in the scheduling logic, the scheduling heuristic further operable to:

identify a scheduling criteria corresponding to the scheduling parameters;

identify a number of instructions per second of the scheduling core;

select, based on the scheduling criteria and the instructions per second, of a number of layers for the scheduling hierarchy, each of the layers corresponding to at least one of the scheduling parameters; and associate each of the layers with at least one of the scheduling parameters.

17. The scheduling engine of claim 12 further comprising a plurality of scheduling cores, each of the scheduling cores associated with at least one of the layers; and coupled to at least one other of the plurality of scheduling cores for iterating through each of the layers corresponding to the scheduling core, the coupling providing communication from one layer to an adjacent layer in the scheduling hierarchy to define a pipelined arrangement of the layers.

18. The scheduling engine of claim 12 wherein the scheduling core further comprises configuration data resources operable to store configuration data defining each of the schedulable entities in the scheduling hierarchy and state data resources operable to store a status of each of the schedulable entities in the scheduling hierarchy.

19. The scheduling engine of claim 12 further comprising a feature core coupled to the scheduling core, the scheduling hierarchy responsive to the feature core for manipulating the schedulable entities for providing configurable scheduling extensions, the configurable scheduling extensions further comprising multilink capability and flow control status.

20. The scheduling engine of claim 12 further comprising a configuration object operable to store the identified throughput requirements and the defined scheduling hierarchy, the encoding the scheduling logic further operable to process the configuration object.

21. The method of claim 20 wherein defining the configuration object further comprises revising the configuration object, reprocessing and applying the revised configuration object in a nonintrusive manner, the nonintrusive manner operable to
allow schedulable entities to remain enqueued in the scheduling hierarchy.

22. The method of claim 12 further comprising a plurality of scheduling hierarchies, each of the scheduling hierarchies corresponding to the scheduling core and responsive to the scheduling logic.

23. The scheduling engine of claim 16 wherein the scheduling parameters comprise time based criteria, priority based criteria, quality based criteria, size based criteria, logical channels, logical queues, multilink bundle queues and physical ports.

24. A method of scheduling message throughput in a hierarchical scheduler comprising:
identifying a set of throughput requirements, the throughput requirements including a number scheduling layers, a number of enqueues per second, and a number of dequeues per second;

computing, based on the throughput requirements, a number of instructions per second for supporting the identified throughput requirements;

defining a schedule hierarchy, the schedule hierarchy having a plurality of schedules, each of the schedules corresponding to a scheduling layer and having a parent-child relation to at least one of the other schedules in the schedule hierarchy;

apportioning, based on the throughput requirements, a portion of the instructions to each of the layers and to the enqueues and dequeues;

allocating, in a memory, scheduling resource information, the memory operable to store the scheduling resource information, the scheduling resource information further comprising configuration data, state data, payload storage, and scheduling logic; and iterating through the defined scheduling hierarchy according to the scheduling logic, the iterating operable to access the allocated scheduling resource information according to the scheduling logic, the scheduling logic operable to access each of the layers of the schedule hierarchy for accessing scheduling resource information corresponding to each of the schedules in the hierarchy;

wherein the schedules in the scheduling hierarchy further comprise a parent-child arrangement, each of the schedules having at least one parent-child association with another schedule in the scheduling hierarchy;

wherein iterating through the defined scheduling hierarchy further comprises:
traversing the schedules in the scheduling hierarchy according to the parent-child associations;
examining, by the scheduling logic, schedulable entities in the traversed schedules; and
propagating the schedulable entities from one schedule to another schedule via the parent child associations according to the scheduling logic.

25. The method of claim 1, wherein
traversing the schedules in the scheduling hierarchy according to the parent-child associations comprises visiting, from a leaf layer having a first number of schedules to a root layer having a second number of schedules, the first number of schedules being greater than the second number of schedules, schedules at adjacent layers according to the parent-child associations between the schedules of the adjacent leaf layer and root layer;

examining, by the scheduling logic, schedulable entities in the traversed schedules comprises examining the schedulable entities to determine which schedulable entity to advance to a successive level in the hierarchy; and propagating schedulable entities from one schedule to another schedule via the parent child associations according to the scheduling logic comprises propagating the schedulable entities from a schedule in a leaf layer to a schedule in a root layer according to the parent-child association between the schedule in leaf layer and the schedule in the root layer.

26. The scheduling engine of claim 12 wherein:
when traversing, the scheduling core is operable to visiting, from a leaf layer having a first number of schedules to a root layer having a second number of schedules, the first number of schedules being greater than the second number of schedules, schedules at adjacent layers according to the parent-child associations between the schedules of the adjacent leaf layer and root layer;

when examining, the scheduling core is operable to examine the schedulable entities to determine which schedulable entity to advance to a successive level in the hierarchy; and when propagating, the scheduling core is operable to propagate the schedulable entities from a schedule in a leaf layer to a schedule in a root layer according to the parent-child association between the schedule in leaf layer and the schedule in the root layer.

27. The method of claim 24, wherein:

traversing the schedules in the scheduling hierarchy according to the parent-child associations comprises visiting, from a leaf layer having a first number of schedules to a root layer having a second number of schedules, the first number of schedules being greater than the second number of schedules, schedules at adjacent layers according to the parent-child associations between the schedules of the adjacent leaf layer and root layer;

examining, by the scheduling logic, schedulable entities in the traversed schedules comprises examining the schedulable entities to determine which schedulable entity to advance to a successive level in the hierarchy; and propagating schedulable entities from one schedule to another schedule via the parent child associations according to the scheduling logic comprises propagating the schedulable entities from a schedule in a leaf layer to a schedule in a root layer according to the parent-child association between the schedule in leaf layer and the schedule in the root layer.

28. The method of claim 1 wherein defining the scheduling hierarchy having the number of layers comprises defining a number of layers within the scheduling hierarchy, the number of layers defined in the scheduling hierarchy being based upon a number of throughput messages per second provided by the data communications device.

* * * * *